United States Patent [19]

Miyagi

[11] 4,087,964
[45] May 9, 1978

[54] SYSTEM FOR INTRODUCING SECONDARY AIR INTO AN INTERNAL COMBUSTION ENGINE

[75] Inventor: Hideo Miyagi, Susono, Japan

[73] Assignee: Toyota Jidosha Kogyo Kabushiki Kaisha, Toyota, Japan

[21] Appl. No.: 733,167

[22] Filed: Oct. 18, 1976

[30] Foreign Application Priority Data

May 1, 1976   Japan ................. 51-049388

[51] Int. Cl.² .............................................. F01N 3/10
[52] U.S. Cl. ........................................ 60/276; 60/290; 60/293
[58] Field of Search ............... 60/290, 276, 289, 293

[56] References Cited

U.S. PATENT DOCUMENTS

| 3,911,674 | 10/1975 | Goto | 60/290 |
| 3,962,867 | 6/1976 | Ikeura | 60/276 |
| 4,014,169 | 3/1977 | Umino | 60/290 |
| 4,037,406 | 7/1977 | Hartel | 60/276 |

Primary Examiner—Douglas Hart
Attorney, Agent, or Firm—Stevens, Davis, Miller & Mosher

[57] ABSTRACT

A system for introducing secondary air into gas exhausted from an internal combustion engine of the carburetor type, provided with a three-way catalytic converter in the exhaust system of the engine. The system includes a flow control valve having a diaphragm operated valve member for controlling the amount of secondary air in accordance with electric signals from a λ-sensor arranged in an exhaust system of the engine so that excess air ratio λ of the exhaust gas, which is introduced into the three-way catalytic converter, is controlled near 1.0. Therefore, effective cleaning operation of the three-way catalytic converter is expected.

9 Claims, 7 Drawing Figures

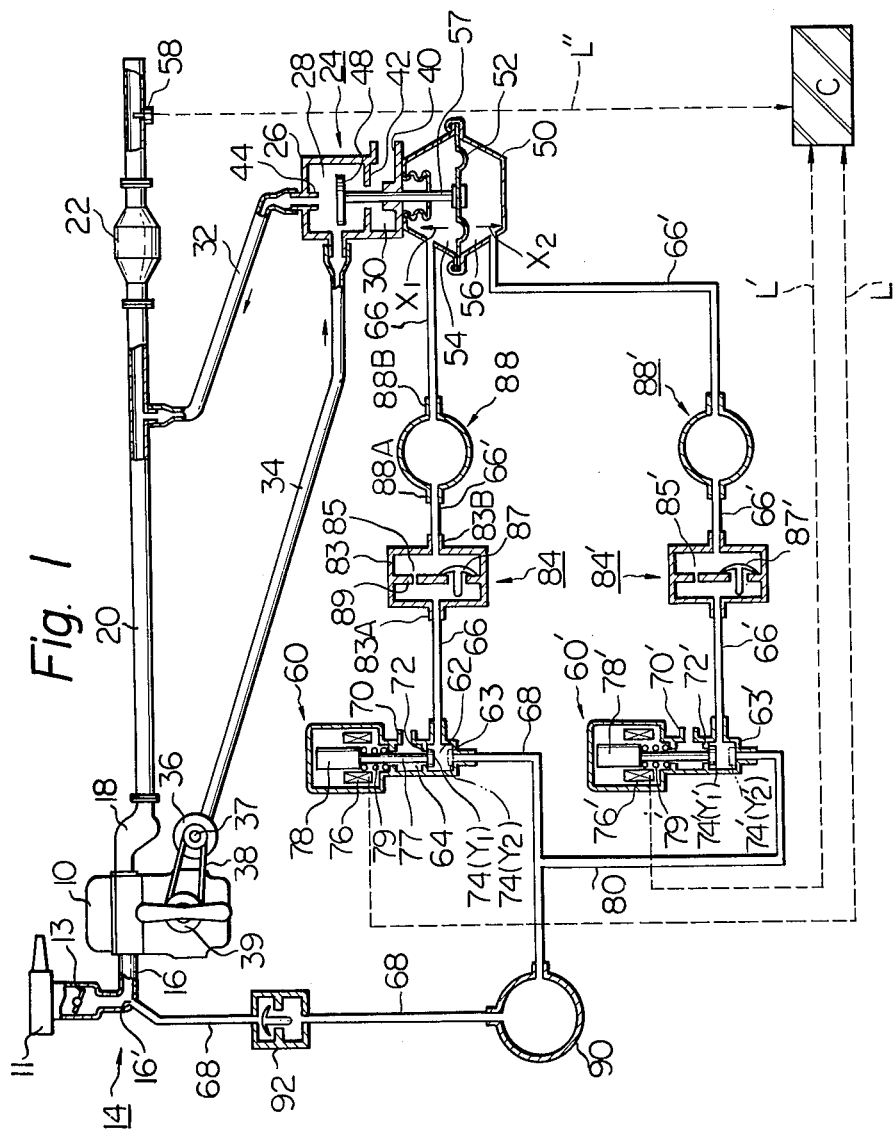

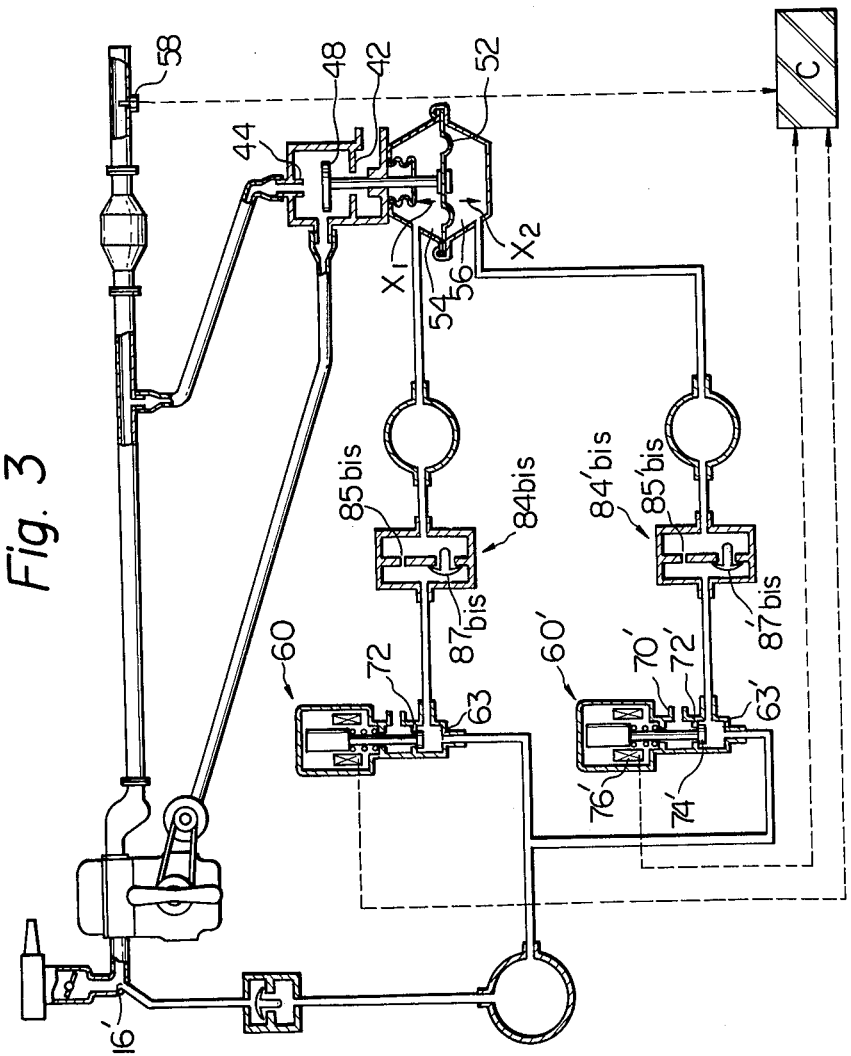

SYSTEM FOR INTRODUCING SECONDARY AIR INTO AN INTERNAL COMBUSTION ENGINE

FIELD OF THE INVENTION

The present invention relates to a system for introducing secondary air into gas exhausted from an internal combustion engine of the carburetor type, provided with a three-way catalytic converter arranged in the exhaust system of the engine.

BACKGROUND OF THE INVENTION

Already known is a three-way catalytic converter, by which three major toxic components (HC, CO and $NO_x$) in the gas exhausted from an internal combustion engine can be eliminated. The operation of this known three-way catalytic converter is effectively attained when an atmosphere of the exhaust gas introduced into the converter is controlled near stoichiometric atmosphere in which excess air or excess fuel is, substantially, not left in the exhaust gas, i.e., excess air ratio $\lambda$ of the exhaust gas is kept near 1.0.

However, it is impossible to keep the $\lambda$ near 1.0 in a known internal combustion engine, especially, in a carburetor type internal combustion engine, therefore, effective operation of the three-way catalytic converter is not expected.

SUMMARY OF THE INVENTION

An object of the present invention is to provide an internal combustion engine provided with a system for introducing secondary air into the engine exhaust system, adapted for controlling the amount of secondary air in such a manner that $\lambda$ is controlled near 1.0 for the effective operation of the three-way catalytic converter.

According to the present invention there is provided a system for introducing secondary air into gas exhausted from an internal combustion engine provided with a three-way catalytic converter in the exhaust system of the engine, said system comprising:

pipe means for introducing secondary air into the engine;

flow control valve means having a valve member arranged in said pipe means for controlling an amount of the secondary air introduced into the engine through said pipe means, and having a diaphragm which is connected to said valve member and which is arranged across the interior thereof so as to form a first and a second control chamber on both sides of the diaphragm, said valve member is moved, by the diaphragm, in one direction to decrease the amount of the secondary air when a pressure at the first control chamber is smaller than a pressure at the second control chamber, and is moved in another direction opposite to said one direction to increase the amount of the secondary air when a pressure at the second control chamber is smaller than the pressure at the first control chamber;

first conduit means adapted for connecting said first control chamber of said flow control valve means with an engine port formed in said engine to transmit a fluid pressure signal to the first chamber;

second conduit means adapted for connecting said second control chamber of said flow control valve means with said engine port;

means for sensing an atmosphere of the exhaust gas, arranged in the exhaust system of the engine in order to provide a signal indicating the excess air ratio $\lambda$ of the exhaust gas;

first fluid signal switching valve means arranged in said first conduit means which has a first and a second position: in said first position, the first control chamber of said flow control valve means being opened to said engine port to transmit said fluid pressure signal to said first control chamber, in said second position, the first chamber being opened to an atmosphere to introduce air into the first control chamber;

second fluid signal switching valve means arranged in said second conduit means which has a first and a second position, in the first position, the second control chamber of said flow control valve means being opened to said engine port to transmit said fluid pressure to said second chamber, in said second position, the second control chamber being opened to an atmosphere for introducing air into the second chamber; and, operating means to operate said first and second fluid signal switching valve means in such a manner that the first fluid signal switching valve means has said first position and the second fluid signal switching valve means has said second position, when an electric signal indicating $\lambda > 1.0$ is transmitted from the sensing means to the operational means so that the diaphragm of the flow control valve is moved in said one direction allowing the amount of secondary air to be decreased, and in such a manner that the first fluid signal switching valve means has said second position and the second fluid signal switching valve means has second position, when said another signal indicating $\lambda < 1.0$ is transmitted from the sensing means so that the diaphragm is moved in said other direction allowing an amount of the secondary air introduced into the engine to be increased, whereby, said excess air ratio $\lambda$ is controlled near 1.0.

BRIEF DESCRIPTION OF THE DRAWING

FIG. 1 is a schematic representation of a first embodiment of the present invention, in which an air pump is used for introducing the secondary air;

FIG. 3 is a modification of the system in FIG. 1;

DESCRIPTION OF THE PREFERRED EMBODIMENTS

Figure 1A:
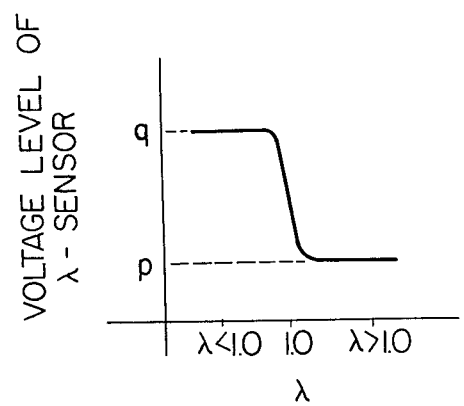
FIG. 1a is a characteristic curve of the $\lambda$-sensor.

FIG. 1 indicates a construction of a first embodiment according to the present invention, in which numeral 10 designates an engine body. Intake air is introduced into the combustion chambers (not shown) in the engine body 10, via an air cleaner 11, a carburetor 14 having a throttle valve 13 and an intake manifold 16. A resultant exhaust gas, due to the combustion in each of the combustion chambers, is introduced, through an exhaust manifold 18, into an exhaust pipe 20. A three-way catalytic converter is disposed in the exhaust pipe 20.

Numeral 24 designates a flow control valve of a diaphragm type for controlling an amount of secondary air introduced into the exhaust pipe 20 so that the exhaust gas can produce a stoichiometric atmosphere in which no excess air or fuel is left in the exhaust gas, i.e., excess air ratio $\lambda$ is kept near 1.0. The flow control valve 24 has a body 26 forming two air chambers 28 and 30. The air chamber 28 is connected to the exhaust pipe 20 through a tube 32 and is connected to an air pump 36 of a vane type through a tube 34. A drive shaft 37 of the air pump 36 is driven by a crankshaft 39 of the engine 10, via a belt 38. The air chamber 30 of the flow control valve 24 is opened to the atmosphere through a port 40.

The flow control valve 24 has a valve member 48 which is arranged between a valve seat 42 communicating the air chamber 28 with the air chamber 30 and a valve seat 44 communicating the air chamber 28 with the tube 32, and has a diaphragm 52 arranged across the interior of a diaphragm casing 50 secured to the body 26, so as to form a first control chamber 54 and a second control chamber 56 on both sides thereof. The diaphragm 52 is connected to the valve member 48 by means of rod 57, the mid-portion of which is slidably supported by the body 26.

Numeral 58 designates a sensor for sensing the atmosphere of the exhaust gas, in other words, "the excess air ratio $\lambda$," in the exhaust pipe 20, for example, a $\lambda$ sensor. The $\lambda$ sensor 58, which is already known, operates to provide electric signals of low and high voltage level as shown by FIG. 1a. The first signal of low voltage level $p$ indicates that an excess amount of air remains in the exhaust gas, in other words, $\lambda > 1$. The second signal of high voltage level $q$ indicates that an excess amount of fuel remains in the exhaust gas, in other words, $\lambda > 1$. In place of the $\lambda$-sensor, other types of sensors, for example, a sensor for detecting CO components remaining in the exhaust gas, may be used. In the embodiment as is explained in FIG. 1, the $\lambda$-sensor 58 is arranged downstream from the catalytic converter 22; however, it is possible to locate the $\lambda$ sensor 58 upstream from the catalytic converter 22. In accordance with the first and second electric signals, a vacuum signal from the engine is transmitted to the first control chamber 54 or to the second control chamber 56 of the flow control valve 24 by a set of electromagnetic valves 60 and 60' described fully hereinafter, in order to decrease or increase the amount of secondary air introduced into the exhaust pipe 20 so that the atmosphere of the exhaust gas introduced into the three-way catalytic converter 22 is controlled near stoichiometric atmosphere in which $\lambda = 1.0$.

The electromagnetic valve 60, which is adapted for switching the transmission of the vacuum signal from the engine to the first control chamber 54 of the flow control valve 24, has two chambers 62 and 64. The chamber 62 communicates with the first control chamber 54 through a conduit 66 and further communicates with a port 16' formed in the intake manifold 16 downstream from the throttle valve 13 through a conduit 68. The other chamber 64 is opened to an atmosphere through a hole 70, and communicates with the chamber 62 through a valve seat 72, on which a valve member 74 is rested. The valve member 74 is connected to a piece 78 made of a permanent magnetic material, through a rod 77, the middle portion of which is slidably supported on a housing. The piece 78 is inserted into a tubular shape solenoid 76. When the solenoid 76 is not energized, the electromagnetic valve 60 is in a first (or OFF) position, in which, the valve member 74 is rested on the valve seat 72 as shown by a solid line $Y_1$ in FIG. 1, so that the conduit 68 is opened to the conduit 66 under a set force caused by a spring 79 in order to transmit a vacuum signal from the port 16' to the first control chamber 54. When the solenoid 76 is energized, the electromagnetic valve 60 is switched to a second (ON) position, in which the valve member 74 is moved to close a valve seat 63 against the set force caused by the spring 79 as shown by a phantom line $Y_2$ in FIG. 1, so that communication between the conduits 66 and 68 is interrupted and further that the conduit 66 is opened to the atmosphere through the hole 70.

The electromagnetic valve 60', which is adapted for switching the transmission of the vacuum signal from the port 16' to the second control chamber 56 of the flow control valve 24, has substantially the same construction as that of the electromagnetic valve 60. When a solenoid 76' is not energized, a valve member 74' is in a first (OFF) position, in which the valve member 74' is rested on a valve seat 72' under a set force caused by a spring as shown by a solid line $Y_1'$ in order to cause a vacuum signal from the port 16' to be transmitted through a vacuum conduit 80 which is connected to the vacuum conduit 68 and through vacuum conduit 66'. When the solenoid 76' is energized, the electromagnetic valve 60' is switched to it's second (ON) position, in which the valve member 74' is moved, against a set stress of a spring 79', to close a valve seat 63' under the influence of an electromagnetic force acting between the piece 78' and the solenoid 76', as shown by a phantom line $Y_2'$. Therefore, the communication between the conduit 80 and conduit 66' is interrupted, and the conduit 66' is then opened to the atmosphere through a hole 70'.

The solenoids 76 and 76' are connected to a computer $c$ through respective signal lines L and L', to which computer $c$ the $\lambda$ sensor 58 is connected through a signal line L". The computer C has, as shown in FIG. 2c, a comparator unit 96 including an input 96A connected to the $\lambda$-sensor 58, another input 96B connected to a battery B, and an output 96C. The comparator unit 96 operates to provide a pulse at the output 96C when the input level at the input 96A is higher than the input level at the input 96B. Whereas, the unit 96 produces no pulse at the output 96C when the input level at the input 96A is lower than the input level at the input 96B. The input level at the input 96B due to the battery B is adjusted so that it is lower than said high voltage level $q$ (FIG. 1a) of a signal indicating that $\lambda < 1.0$. Therefore, the comparator 96 provides a pulse at the output 96C when $\lambda < 1.0$, while providing no pulse when $\lambda > 1.0$. The output 96C of the comparator 96 is connected through an amplifier unit 97 to the solenoid 76 of the first valve 60, and is further connected to the solenoid 76' of the second valve 60' through an inverter unit 98 and another amplifier unit 99. The inverter 98 operates to provide a pulse at the output 98B when no pulse is received at the input 98B. Thus the computer operates to provide a pulse to energize the solenoid 76, when the high voltage level signal $q$ (FIG. 1a) indicating $\lambda < 1.0$ is received from the $\lambda$-sensor 58, in order to increase the amount of secondary air introduced into the exhaust pipe 20, and to provide another pulse for energizing the solenoid 76' when the low voltage level signal $p$ indicating $\lambda > 1.0$ is received from the $\lambda$-sensor, in order to decrease the amount of secondary air introduced into the exhaust pipe 20, whereby an atmosphere of the exhaust gas is controlled near stoichiometric atmosphere ($\lambda = 1.0$). This operation will be more fully described hereinafter.

According to the first embodiment described hereinbefore, a delay unit comprised of a vacuum delay valve 84 and a vacuum tank 88 is arranged on the conduit 66 between the electromagnetic valve 60 and the first control chamber 54 of the flow control valve 24, in order to restrict transmission of a vacuum pressure signal from the port 16' to the first control chamber 54. The vacuum delay valve 84 including a casing 83 has an inlet port 83A connected to the electromagnetic valve 60 and an outlet 83B. A partition 89, which provides an orifice 85 to restrict transmission of the vacuum signal and a check valve 87, are arranged between the ports 83A and 83B. The check valve 87 provides a by-pass of air when the electromagnetic valve 60 is energized. The tank 88 has an inlet 88A connected to the port 83B and an outlet 88B connected to the first control chamber 54. These ports 84 and 88 are adapted for preventing an abrupt movement of the diaphragm 52 of the flow control valve 24 when the electromagnetic valve 60 is switched on and off.

Another vacuum delay valve 84' and another vacuum tank 88' are arranged between the second electromagnetic valve 60' and second control chamber 56 of the flow control valve, in order to restrict the transmission of a vacuum signal from the port 16' to the second control chamber 56.

A vacuum tank 90 is arranged on the conduit 68 upstream from the electromagnetic valves 60 and 60'. This vacuum tank 90 assures that a vacuum signal of a sufficient level is transmitted toward the first or second control chambers 54 or 56, when the engine is undergoing an accelerating operation, in which the vacuum level at the port 16' is relatively low.

A check valve 92 is arranged on the vacuum conduit 68 between the port 16' and the tank 90. This check valve 92 serves to transmit the vacuum signal from the engine toward the control chambers 54 or 56, while preventing transmission of air from the electromagnetic valves 60 and 60' toward the carburetor 14.

The operation of the first embodiment is described hereinbelow.

When the excess air ratio $\lambda$ is larger than 1.0, the $\lambda$-sensor 58 transmits a first electric signal of low level $p$ (FIG. 1a) to the computer $c$, indicating that air remains in the exhaust gas. This electric signal of level $p$ is transmitted to the input 96A (FIG. 2c) of comparator 96 of the computer $c$. Since the voltage level at the other input 96B is adjusted so that it is larger than the level $p$, the comparator 96 provide no pulse at the output 96C so that the solenoid 76 of the first valve 60 cannot be energized. When there is no pulse at the input 98A of the inverter 98 connected to the comparator, the inverter 98 provides a pulse at the output 98B which is transmitted, through the amplifier unit 99 to the solenoid 76' of the second valve 60, to cause the solenoid 76' to be energized.

In this way, the electromagnetic valve 60' provides the "ON position" by which the valve member 74' closes the valve seat 63', as shown by the phantom line $Y_2'$ in FIG. 1, so as to cause the second control chamber 56 of the flow control valve 24 to be opened to the atmosphere, via the hole 70', a check valve 87' of the vacuum delay valve 84' and the vacuum tank 88; whereas the computer $c$ does not energize the solenoid 76 of the first electromagnetic valve 60, so that said valve 60 is in it's OFF position in which the valve member 74 closes the valve seat 72, as shown by the solid line $Y_1$, under the stress of the spring 79. A vacuum signal is transmitted from the port 16' to the first chamber 54 of the flow control valve 24, via the check valve 92, the vacuum tank 90, the chamber 62, the orifice 85 and the vacuum tank 88. In this operation, since the vacuum level at the first control chamber 54 is gradually increased due to the existence of the orifice 85 while the second control chamber 56 is at atmospheric pressure from the beginning of the energizing process of the solenoid 76' due to the existence of the check valve 87, the pressure difference between the first and second control chambers 54 and 56 is gradually increased, so that the diaphragm 52 is gradually displaced upwardly from a time $t_1$, as shown by an arrow $X_1$, allowing the valve member 48 to be gradually moved toward the valve seat 44, as shown by a line segment $l_1'$ in FIG. 2b. Therefore, the amount of the secondary air, which is introduced into the exhaust pipe 20 through the tube 32 from the air pump 36 through the tube 34 is gradually decreased due to the fact that the flow resistance between the tubes 32 and 34 is increased. In this case, the excess amount of air from the air pump 36 is diverted to the atmosphere through the air chambers (28, 30) and the port 40. Because the amount of the secondary air is being reduced gradually, the excess air ratio $\lambda$ of the exhaust gas is also gradually being reduced from a time $t_2$, as shown by a line segment $l_1$ in FIG. 2a, toward point Q at which $\lambda = 1.0$ (the stoichiometric atmosphere). After this the $\lambda$ is gradually decreased as shown by a line segment $l_2$ due to the valve member 48 being moved toward the valve seat 44, as shown by the line segment $l_2'$ in FIG. 2b.

When $\lambda$ become smaller than 1.0, the $\lambda$ sensor 58 produces a second electric signal of high voltage level $q$ (FIG. 1a) which is transmitted to the input 96A of the comparator 96 of the computer $c$. Since the voltage level at the input 96B of the comparator 96 is adjusted so that it is smaller than voltage level at the input 96A, the comparator 96 provides a pulse at the output 96C, in order to energize the solenoid 76 of the first valve 60. In this case, since there is a pulse at the input 98A of the inverter 98 connected to the comparator 96 the inverter 98 does not provide a pulse at the output 98B, therefore the solenoid 76' of the second valve 60' does not energized.

In this way the computer $c$ then transmits a signal to the electromagnetic valve 60 to energize the solenoid 76 so as to displace the piece 78 against the spring 79 under the influence of the electromagnetic force acting between the solenoid 76 and the piece 78, so that the electromagnetic valve 60 is switched to its ON position in which the valve member 74 closes the valve seat 63, as shown by the phantom line $Y_2$, so as to cause the first control chamber 54 to be opened to the atmosphere through the hole 70, the check valve 87 and a vacuum tank 88; whereas the computer $c$ de-energizes the solenoid 76' of the second electromagnetic valve 60', so that the valve 60' is switched to the OFF position in which the valve member 74' closes the valve seat 72', as shown by the solid line $Y_1'$, under the stress of the spring 79 so as to allow a vacuum signal to be transmitted from the port 16' to the second chamber 56, via the check valve 92, the vacuum tank 90, the orifice 85' and the tank 88'. In this case, since the vacuum level of the second control chamber 56 is gradually increased due to the existence of the orifice 85' while the first control chamber 54 is at an atmospheric pressure from the beginning of the energizing process of the solenoid due to the existence of the check valve 87, the pressure difference between the first and the second control chambers 54 and 56 is gradually increased so that the diaphragm 52 is gradually displaced downwardly as shown by an arrow $X_2$ in FIG. 1 from a time $t_3$, allowing the valve member 48 to be moved toward the valve seat 42, as shown by a line segment $l_3'$ in FIG. 2b. Therefore, the amount of the secondary air introduced into the exhaust pipe 20 from the air pump 36 is increased; thus, the excess air ratio λ of the exhaust gas is gradually increased, as shown by a line segment $l_3$ in FIG. 2a, from a time $t_4$ toward points at which λ = 1.0.

As is clear from the above-mentioned operation of the present invention, the atmosphere of the exhaust gas is controlled near stoichiometric atmosphere, (as indicated by points Q, R, etc.) at which λ = 1.0, because the amount of the secondary air introduced into the exhaust pipe 20 is decreased or increased by the flow control valve 24 in accordance with the first or second electric signal indicating λ > 1.0 or λ > 1.0, respectively, so that the three-way catalytic converter 22 operates at a maximum efficiency to effectively eliminate the toxic components left in the exhaust gas.

Figure 2A:
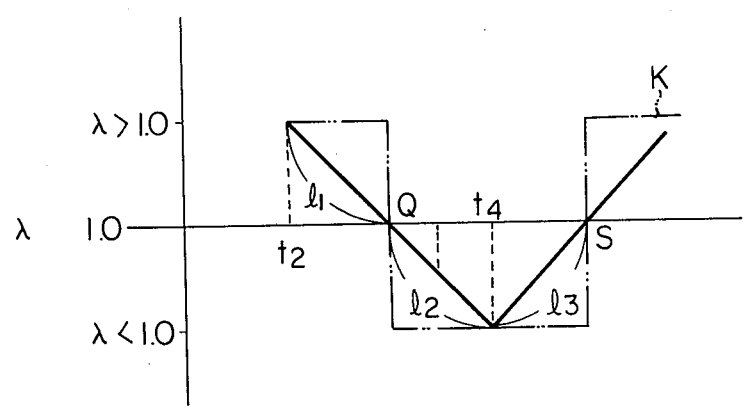
FIGS. 2a and 2b are graphs showing the operation of the system in FIG. 1.
Figure 2B:
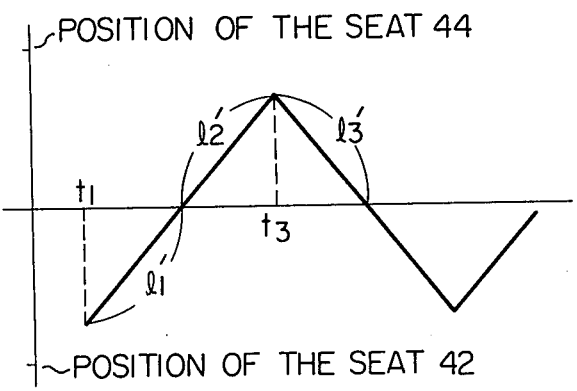
Figure 2C:
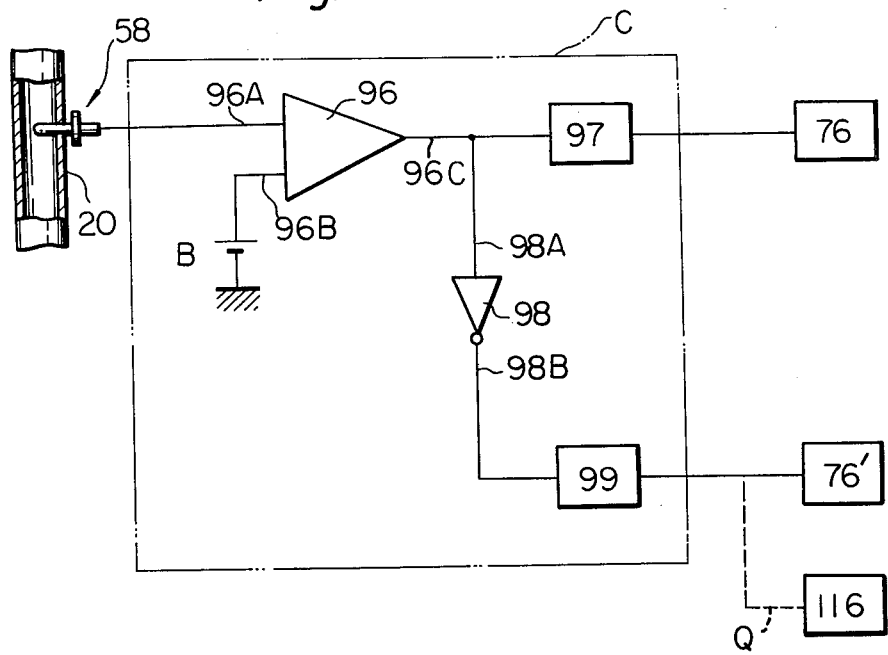
FIG. 2c is a diagrammatic view of the computer in FIG. 1.

As is clear from the above-mentioned description, according to the invention, since the pressure difference between the first and second control chambers 54 and 56 is gradually increased when the electromagnetic valve 60 (or 60') is switched in order to move the diaphragm 52 in the direction of the arrow $X_1$ (or $X_2$) at a low speed due to the existence of the vacuum delay valve 84 (or 84') and the vacuum tank 88 (or 88'), therefore, the excess air ratio λ of the exhaust gas is controlled near 1.0 as shown by the graph of FIG. 2a, which is desirable for the operation of the three-way catalytic converter 22. If the delay elements 84 and 88 (or 84' and 88') are not used, the excess air ratio λ will be controlled as shown by a phantom lines K in FIG. 2a, which is not suitable for the operation of the three-way catalytic converter 22.

The vacuum tank 90 operates to maintain a sufficient level of the vacuum in the control chambers 54 or 56 downstream from the tank 90 when the engine is undergoing acceleration in which the vacuum level at the port 16' is low due to a large throttle opening. Therefore, the above-mentioned operation of the flow control valve 24 to control the excess air ratio λ near 1.0 is expected during the acceleration.

In a modification of the first embodiment, shown in FIG. 3, the position of the check valve $87_{bis}$ ($87_{bis}'$) of a delay valve $84_{bis}$ ($84_{bis}'$) is inverted if compared with the position of the check valve 87 (87') of the delay valve 84 (84') in FIG. 1. Other constructions are substantially the same as those in FIG. 1. This delay valve $84_{bis}$ ($84_{bis}'$) (FIG. 3) operates to restrict the transmission of the atmospheric air.

In the operation of this modification according to FIG. 3, when the first electric signal, indicating that λ > 1.0, is being transmitted to the computer c from the λ sensor 58, the electromagnetic valve 60 is in it's "OFF" position in which the valve member 74 closes the valve seat 72 whereas the electromagnetic valve 60' is in it's "ON" position in which the valve member 74' closes the valve seat 63', which operation is already described with respect to the embodiment in FIG. 1. In this operation, a pressure at the second chamber 54 is gradually increased to atmospheric pressure because the transmission of air from the port 70 of the electromagnetic valve 60' to the second chamber 56 is restricted by the orifice $85_{bis}'$ of the delay valve $84_{bis}'$; whereas; the first chamber 54 is at the full level of the vacuum from the beginning of the switching process due to existence of the check valve $87_{bis}$. As a result of this, the pressure difference between the first and second chambers 54 and 56 is gradually increased so that the diaphragm 52 is gradually displaced, as shown by the arrow $X_1$, allowing the valve member 48 to be gradually moved toward the valve seat 44 in order to decrease the amount of the secondary air.

When the second electric signal indicating that λ<1.0 is being transmitted to the computer c from the λ sensor 58, the electromagnetic valve 60 is switched to it's ON position in which the valve member 74 closes the valve seat 63', whereas, the electromagnetic valve 60' is switched to it's OFF position in which the valve member 74' closes the valve seat 72'. In this operation, pressure at the first chamber 54 is gradually increased to atmospheric pressure due to the existence of the orifice $85_{bis}$; whereas, the second chamber 56 is at a full vacuum level from the energizing process of the solenoid 76' due to the existence of the check valve $87_{bis}'$. As a result of this, the diaphragm is gradually displaced, as shown by the arrow $X_2$, allowing the valve member 48 to be gradually moved toward the valve seat 42 in order to increase the amount of the secondary air. Thus, in this modification, the operational speed of the valve member 48 can also be restricted to control the desirable valve of λ, as shown in FIG. 2a.

Figure 4:
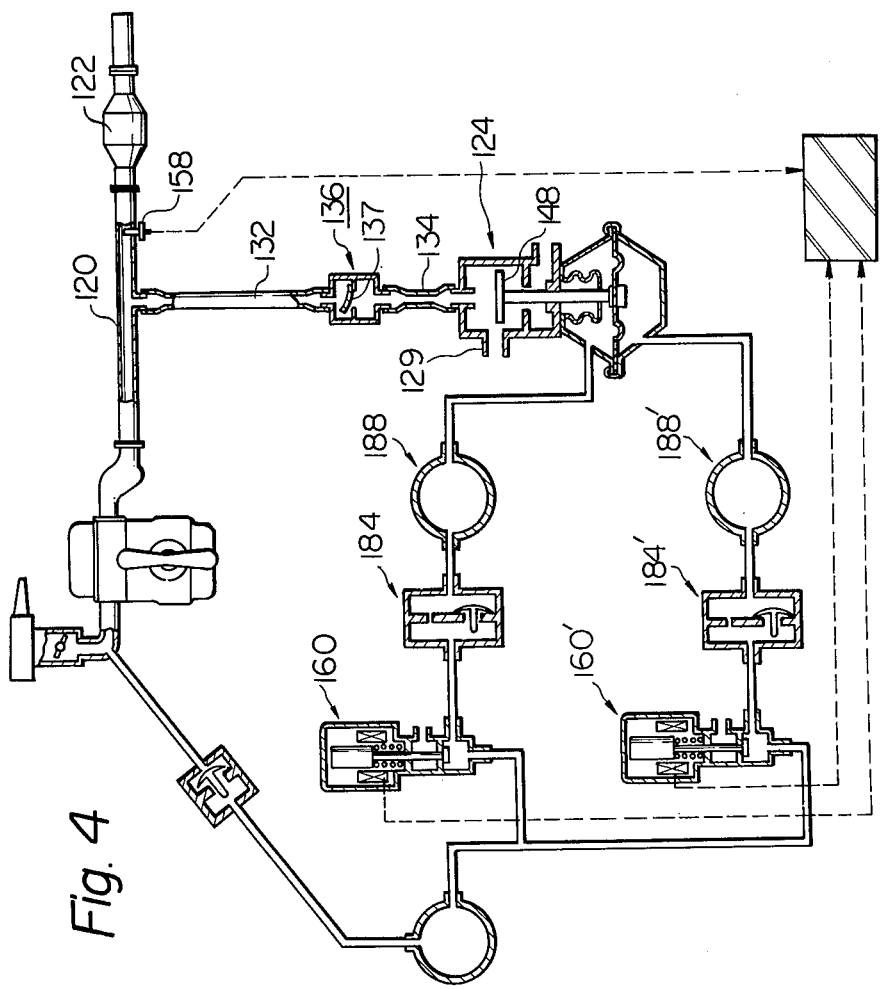
FIG. 4 is a schematic representation of a second embodiment of the present invention, in which a reed valve is used for introducing the secondary air.

FIG. 4 shows the construction of a second embodiment according to the invention. In place of the air pump 36 in the first embodiment a reed valve 136 is used, said valve 136 having a reed 137 for opening or closing under a vacuum pressure formed in the exhaust pipe 120 to introduce secondary air into the pipe 120. The flow control valve 124 is slightly modified so as to have a port 129 opened to the atmosphere for introducing air into the exhaust pipe 120, through a tube 134, the reed valve 136 and a tube 132. A λ sensor 158 is arranged upstream from a three-way catalytic converter 122. Other constructions of this second embodiment are substantially the same as those of the first embodiment in FIG. 1.

This second embodiment operates in substantially the same manner as that of the first embodiment, except that in the second embodiment, the secondary air is introduced into the exhaust pipe 120 from the port 129 through the tube 134, the reed valve 136 and the tube 132 under a suctional force caused by vacuum pressure formed in the exhaust pipe 120. The thus introduced amount of air is controlled by the flow control valve 124 operated by a first and a second electromagnetic valves 160 and 160' in accordance with the first and second electric signals from the λ sensor 156, so that the excess air ratio λ is controlled near 1.0 suitable for the operation of a three-way catalytic converter 122. Each delay unit is comprised of a delay valve 184 (184') and a tank 188 (188') serving to restrict the speed of the movement of the valve member 148 of the flow control valve 124, in order to obtain a desired control characteristic as shown by FIG. 2a.

Other modifications can be made by those skilled in this field without departing from the scope of the invention.

What is claimed is:

1. A system for introducing secondary air into gas exhausted from an internal combustion engine provided with a three-way catalytic converter in the exhaust system of the engine, said system comprising:
pipe means for introducing secondary air into the engine;
flow control valve means having a valve member arranged in said pipe means for controlling an amount of the secondary air introduced into the engine through said pipe means, and having a diaphragm which is connected to said valve member which is arranged across the interior thereof so as to form a first and a second control chamber on both sides of the diaphragm, said valve member is moved by said diaphragm in one direction to decrease the amount of the secondary air when a pressure at said first control chamber is smaller than a pressure at said second control chamber, and is moved in another direction opposite to said one direction to increase the amount of the secondary air when a pressure at said second control chamber is smaller than a pressure at said first control chamber;

first conduit means adapted for connecting said first control chamber of said flow control valve means with an engine port formed in said engine to transmit a fluid pressure signal to said first control chamber;

second conduit means adapted for connecting said second control chamber of said flow control valve means with said engine port;

means for sensing an atmosphere of the exhaust gas, arranged in said exhaust system of the engine in order to provide electric signals indicating the excess air ratio λ of the exhaust gas in the exhaust system, first fluid signal switching valve means arranged in said first conduit means which has a first and a second position, in said first position, said first control chamber of said flow control valve means being opened to said engine port for transmitting said fluid pressure signal to said first control chamber, and in said second position, said first control chamber being opened to an atmosphere to introduce atmospheric air into the first control chamber;

second fluid signal switching valve means arranged in said second conduit means which has a first and a second position, in said first position, said second control chamber of said flow control valve means being opened to said engine port to transmit said fluid pressure to said second chamber, in said second position, said second control chamber being opened to an atmosphere to introduce air into said second control chamber; and, operating means to operate said first and second fluid signal switching valve means in such a manner that said first fluid signal switching valve means is in it's first position and said second fluid signal switching valve means is in it's said second position, when an electric signal indicating λ > 1.0 is transmitted from the sensing means to the operational means so that the diaphragm of said flow control valve is moved in said one direction allowing the amount of the secondary air to be decreased, and in such a manner that said first fluid signal switching valve means is in it's said second position and that said second fluid signal switching valve means is in it's first position, when another electric signal indicating λ < 1.0 is transmitted from the sensing means so that said diaphragm is moved in said other direction allowing an amount of the secondary air introduced into the engine to be increased, whereby said excess air ratio λ is controlled near 1.0.

2. A system for introducing secondary air into gas exhausted from an internal combustion engine according to claim 1, wherein said system further comprises a signal delay means arranged in said each conduit means between the respective signal switching valve means and the respective control chamber of said flow control valve for the restriction of the transmission of said fluid pressure signal to the respective control chamber, in order to gradually increase the pressure difference between the control chambers of said flow control valve means, whereby movement of said valve member in said one direction and in said other direction can be slowed down.

3. A system according to claim 2, wherein said fluid pressure signal is a vacuum signal from a vacuum port formed in the intake system of the engine downstream from the throttle valve.

4. A system according to claim 3, wherein each of said signal delay means comprises: a vacuum delay valve including a casing which has a first port and has a second port for connection to said vacuum port, a partition between said ports having an orifice to restrict transmission of said vacuum signal to the respective control chamber when said respective fluid signal switching valve means is in it's first position, and a check valve to provide a by-pass of atmospheric air when said respective fluid signal switching valve means is in it's second position; and a tank having an inlet connected to said first port of said respective vacuum delay valve and outlet connected to said respective control chamber of said flow control valve means.

5. A system according to claim 3, wherein said signal delay means comprises: an air delay valve including a casing which has a first port and has a second port for connection to said vacuum port, a partition between said ports having an orifice to restrict transmission of air from the atmosphere to the respective control chamber when said respective fluid signal switching valve means is in it's second position, and a check valve to provide a by-pass of said vacuum signal when said respective fluid signal switching valve means is in it's first position; and a tank having an inlet connected to said first port of said respective air delay valve and an outlet connected to said respective control chamber of said flow control valve means.

6. A system according to claim 1, wherein an air pump driven by the crankshaft of the engine is provided in said pipe means for forcibly introducing the secondary air into the engine.

7. A system according to claim 1, wherein a reed valve provided with a reed is arranged in said pipe means connected to the exhaust system for introducing secondary air due to a suctional force caused by vacuum pressure momentarily formed in said exhaust system of the engine.

8. A system according to claim 3, wherein said first and second conduit means are connected to said vacuum port via a common conduit, on which common conduit a vacuum tank is provided for assuring the transmission of a vacuum signal of a sufficient level when the engine is in its acceleration operation.

9. A system according to claim 1, wherein each of said fluid signal switching valve means comprises an electromagnetic valve.

* * * * *